US007327731B1

(12) United States Patent
Kumar et al.

(10) Patent No.: US 7,327,731 B1
(45) Date of Patent: Feb. 5, 2008

(54) POINT-TO-MULTIPOINT CONNECTIONS FOR DATA DELIVERY

(75) Inventors: Pankaj Kumar, Edison, NJ (US); John Babu Medamana, Colts Neck, NJ (US); Jeewan P. Ramsaroop, Edison, NJ (US)

(73) Assignee: AT&T Corp., New York, NY (US)

( * ) Notice: Subject to any disclaimer, the term of this patent is extended or adjusted under 35 U.S.C. 154(b) by 1020 days.

(21) Appl. No.: 10/409,790

(22) Filed: Apr. 9, 2003

(51) Int. Cl.
*H04L 12/16* (2006.01)
*H04L 12/28* (2006.01)
*G06F 15/16* (2006.01)

(52) U.S. Cl. ............... 370/390; 370/260; 370/401; 709/230

(58) Field of Classification Search ........ 370/260–278, 370/312–324, 389–452; 709/223–251
See application file for complete search history.

(56) References Cited

U.S. PATENT DOCUMENTS

| 4,430,699 | A | * | 2/1984 | Segarra et al. ........... 709/230 |
| 5,926,474 | A | | 7/1999 | Bolosky et al. |
| 6,009,092 | A | * | 12/1999 | Basilico ................ 370/352 |
| 6,151,696 | A | | 11/2000 | Miller et al. |
| 6,272,127 | B1 | | 8/2001 | Golden et al. |
| 6,385,647 | B1 | | 5/2002 | Willis et al. |
| 6,453,438 | B1 | | 9/2002 | Miller et al. |
| 6,469,981 | B1 | | 10/2002 | Anhorn |
| 6,625,151 | B1 | * | 9/2003 | Alowersson et al. ....... 370/390 |
| 6,751,218 | B1 | * | 6/2004 | Hagirahim et al. ........ 370/390 |
| 6,754,211 | B1 | * | 6/2004 | Brown .................. 370/389 |
| 6,795,433 | B1 | * | 9/2004 | Li ....................... 370/389 |
| 6,856,622 | B1 | * | 2/2005 | Calamvokis et al. ....... 370/390 |
| 6,875,274 | B2 | * | 4/2005 | Wong et al. .............. 117/105 |
| 7,065,077 | B1 | * | 6/2006 | Radhakrishnan et al. ... 370/389 |
| 2002/0075878 | A1 | * | 6/2002 | Lee et al. ............... 370/401 |
| 2004/0064521 | A1 | * | 4/2004 | Baudry et al. ........... 709/213 |
| 2005/0207354 | A1 | * | 9/2005 | Nekovee et al. .......... 370/260 |

FOREIGN PATENT DOCUMENTS

EP        0 552 794 A2      7/1993

* cited by examiner

*Primary Examiner*—Man U. Phan
(74) *Attorney, Agent, or Firm*—Hoffmann & Baron, LLP

(57) ABSTRACT

The present invention provides a technique for achieving reliable delivery of bulk data from a single origin to multiple destinations such that the origin only sends the data once to the network, without waiting for the destinations to be connected to the network. The data is delivered from the network to each destination, thereby creating a point-to-multipoint connection between the origin and the destination. To achieve such data delivery, both the origin and each delivery site execute site connection-manager software that allows the origin and the intended destinations to create the needed connections to facilitate data delivery and the network switches execute a network connection manager. Once the origin transmits the data and receives an acknowledgement from the network, the origin disconnects and does not wait for actual receipt by each destination. The destinations are referred to as "late" on two instances. One instance occurs when the destination connects to the network after the origin has already begun sending data to the network. The other instance occurs when the destination connects to the network after the origin has sent all the data to the network and the origin is disconnected from the network.

12 Claims, 3 Drawing Sheets

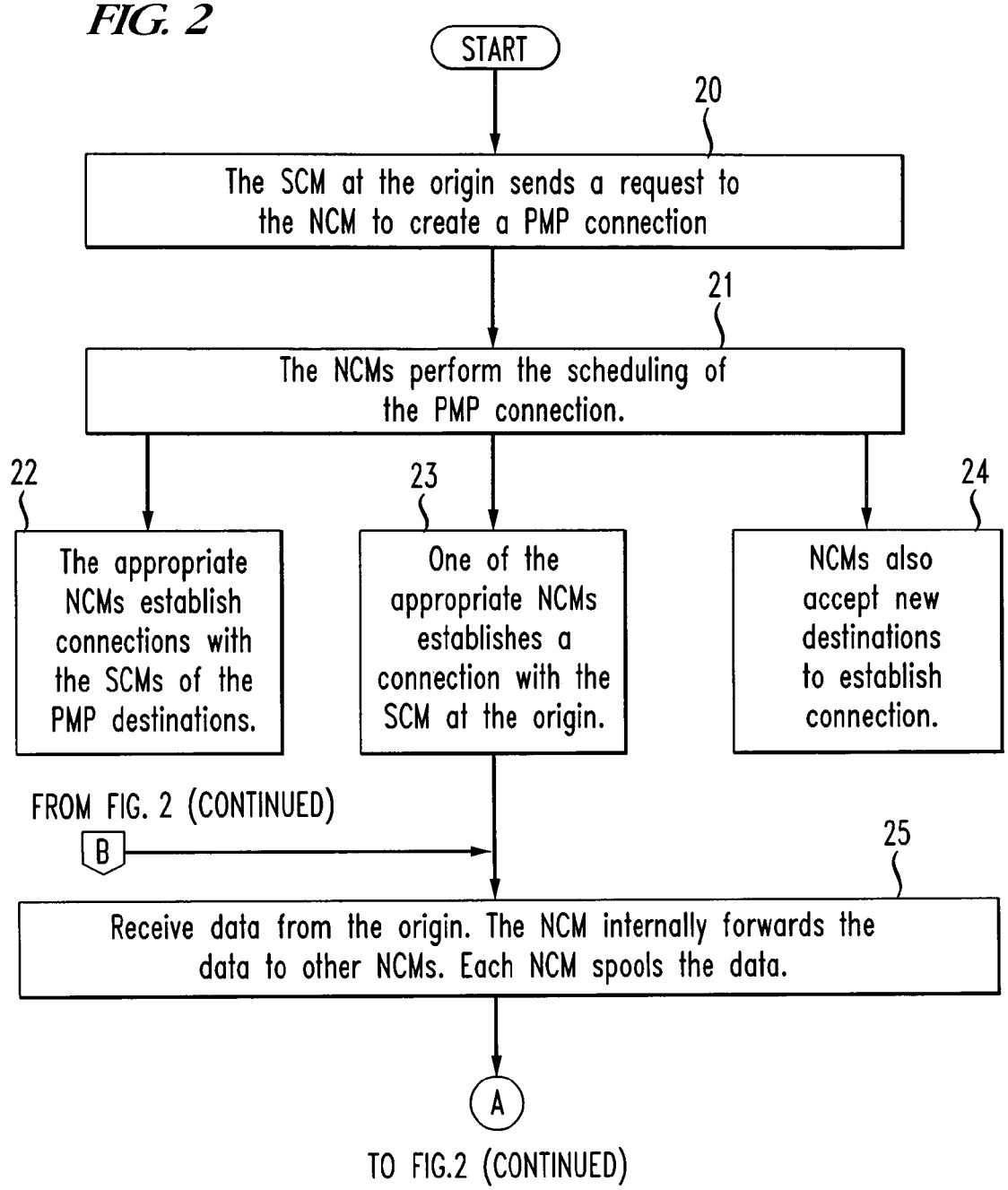

POINT-TO-MULTIPOINT CONNECTIONS FOR DATA DELIVERY

FIELD OF THE INVENTION

This invention relates to the field of communications supporting guaranteed data delivery on unreliable (i.e. best effort) networks. More specifically, the present invention relates to providing application independent, decoupled point-to-multipoint (PMP) connections for providing guaranteed data delivery service.

BACKGROUND OF THE INVENTION

Multicasting is a network feature such that a packet from a single source can be delivered to multiple destinations. Typically, delivery is not guaranteed by the network although protocols exist to provide reliability.

Content distribution is an application level feature and greatly benefits with the availability of the network multicasting. However, multicasting by itself is not sufficient to meet the requirements of the content distribution in enterprise environment. Multicasting requires all destinations to be available and listening at the time of transmission. If a destination joins a multicast session late then it receives only partial data from the time it joined the session. In case of site failures or unavailability, the origin may be required to retransmit the data multiple times to deliver data to all sites. Furthermore, in the case of multicast content distribution, the data will be sent from the origin to the network at the speed of the lowest link among all destinations even if the origin and other sites may be connected to the network by high bandwidth links. Multicasting requires all destinations to join the multicast session at the time of data distribution. In most enterprise environments this requirement is difficult to meet due to several reasons. One main reason is that most of the enterprises that build their private networks are MNCs with large number of sites (few hundreds to few thousands) distributed across several countries. Thus, difference in time zones within U.S. and across other countries makes it difficult for all sites to join the multicast session at the same time. Other reasons are different work schedules or shifts, sites being unavailable or down, and/or other scheduling conflicts. In the case of multicasting, the data from the data centers can be sent only at the lowest speed amongst all destinations. In the WAN environment, typically, customers would like to be able to send or receive contents to or from the network at the speed of the link connecting the site to the network because data centers are usually connected to the network at higher speeds than remote locations.

In the WAN environment, an enterprise customer is most concerned about minimizing the delay by using caching, etc., and maximizing the utilization of the bandwidth. Clearly, to meet these requirements, several functionalities on top of multicasting are needed.

SUMMARY OF THE INVENTION

The present invention provides a system and a method in the form of application independent, decoupled, persistent, reliable, and extendible point-to-multipoint (PMP) connections with per destination scheduling, network spooling and playback, check-pointing and restart for providing guaranteed delivery of data from origin to multiple destinations such that the data is sent from the origin to the network only once at the speed of the link connecting the origin to a network and without waiting for the destinations to be connected to the network. The method further includes having the network store the data received from the origin in the same format and sequence as sent by the origin, creating point-to-multipoint connections with the destinations either upon request by the destination or upon request by the network based on a predetermined schedule, and sending the stored data from the network to each connected destination in the same format and sequence as sent by the origin. The method also allows the point-to-multipoint connection to be extended to new destinations any time before, during, or after the transmission of the data from the origin to the network.

DETAILED DESCRIPTION OF THE INVENTION

For the purposes of the present invention, the following definitions will apply:

A "point-to-multipoint connection" (PMP) is a connection from an origin to multiple destinations.

A "decoupled" connection is a connection in which the origin does not connect with the destinations directly but uses network as a rendezvous point. In the "decoupled" PMP connection, the origin and destinations connect to the network independent of one another.

A "persistent" connection is a connection that continues to exist even when the origin or the destinations are no longer connected to it. The connection continues to exist until either explicitly requested to be removed or time-to-live parameter associated with it has expired.

A "reliable" PMP connection is a connection that guarantees the delivery of data from origin to the network and from the network to each destination in the same format and sequence as was sent by the origin to the network.

An "extendible" PMP connection is a connection that allows the reach of the PMP connection to be extended to new destinations (not specified at the time of creating the PMP connection) as long as the PMP connection exists in the network.

"Network spooling" is the capability of the network to store the packets sent by the origin to the network on the PMP connection. The packets are stored in the same format and sequence as sent by the origin.

"Playback" is the capability of the network to transmit the spooled data associated with the proposed PMP connection to any destination that connected "late". A destination is "late" if it was not connected at the time when the origin started sending the packets to the network on the proposed PMP connection.

"Per destination scheduling" is the capability to set scheduling constraints for each destination. Network will then deliver data to each destination based on its scheduling constraint.

"Check-pointing and restart" is the network capability to maintain the state of the data transmission either from origin to the network or from network to each destination and in the event of failure resume transmission from the last check-pointed state.

Figure 1:
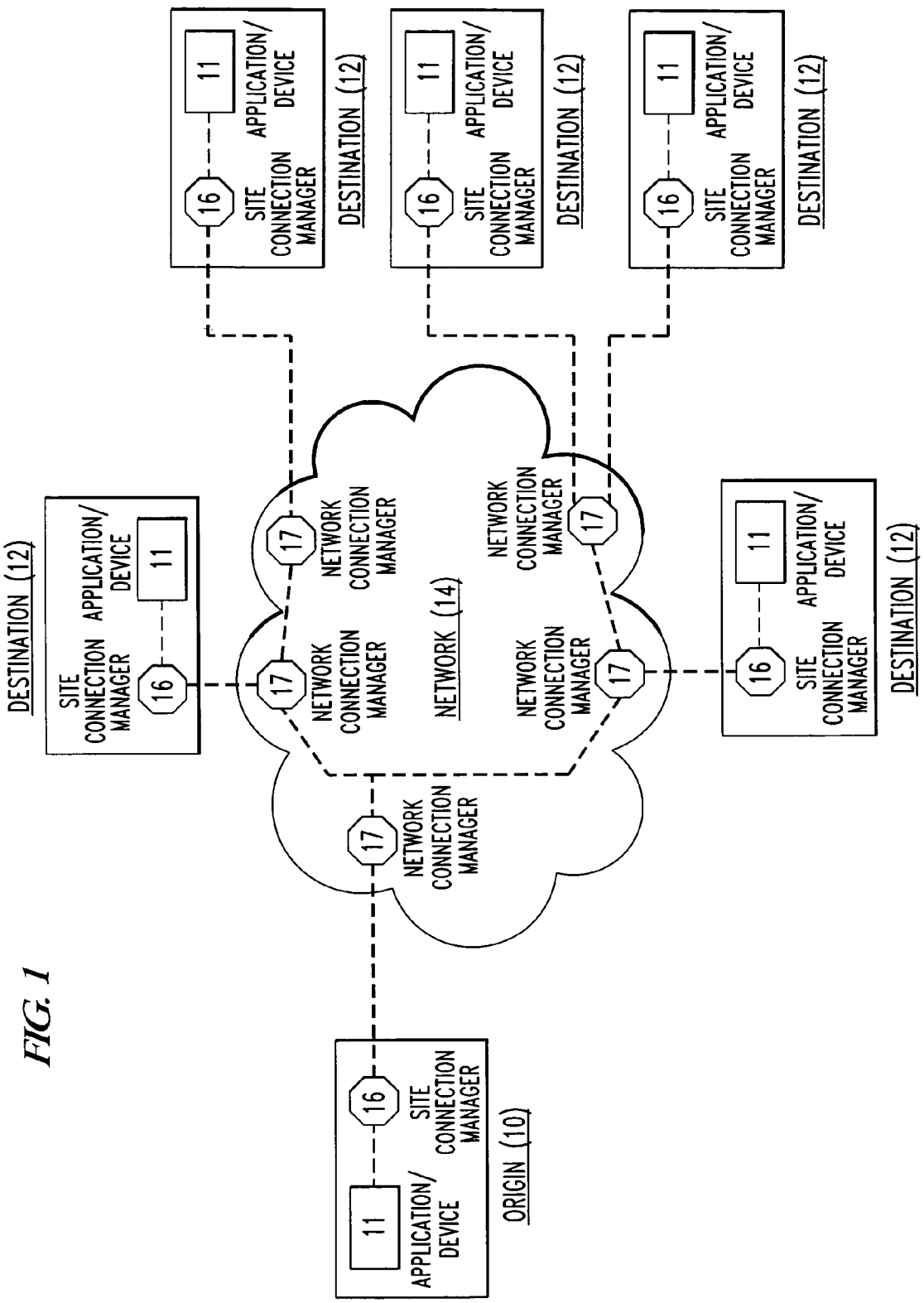
FIG. 1 is a block diagram illustrating bulk data delivery according to the embodiment of the present invention.
Figure 2:
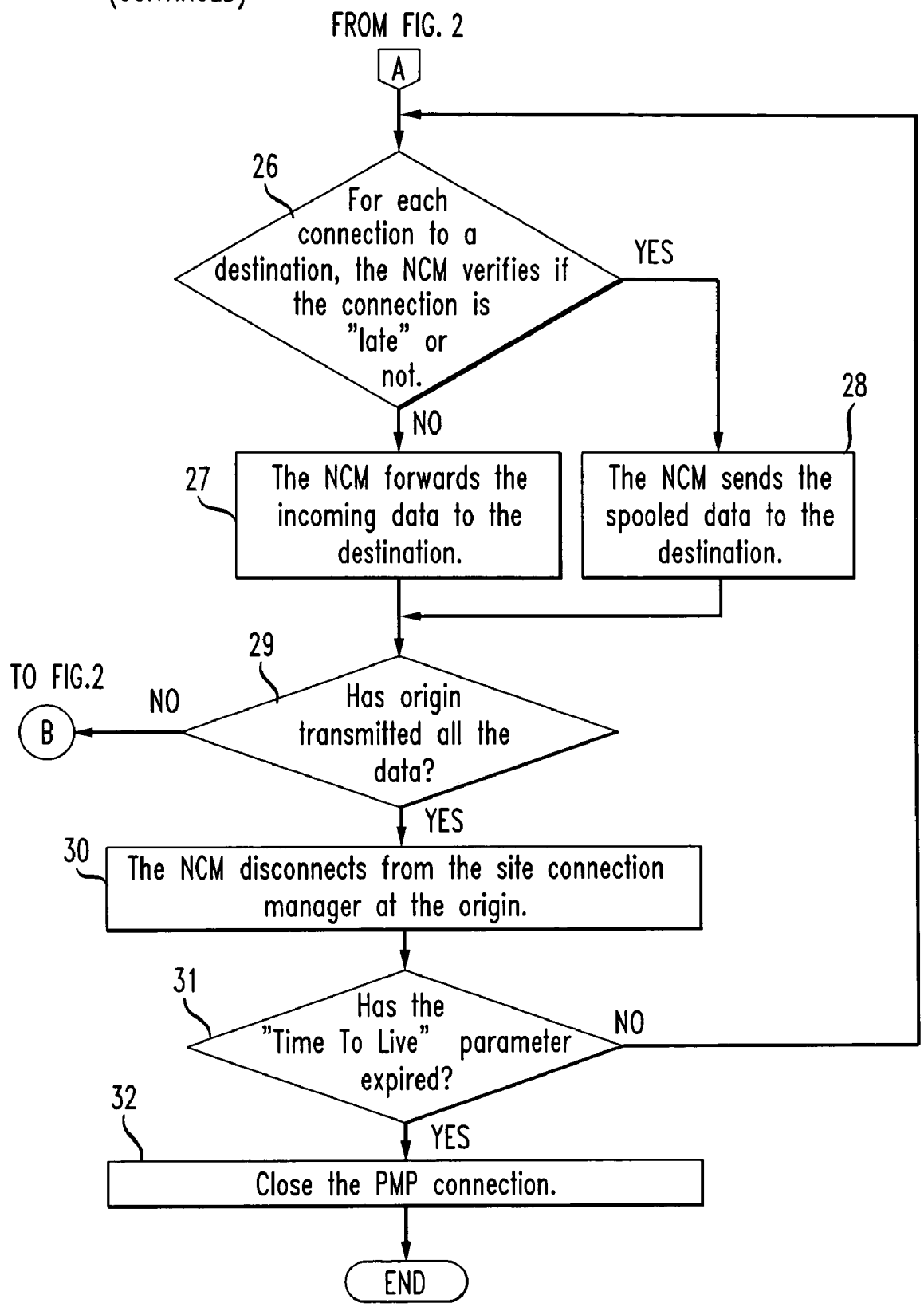
FIG. 2 is a flow chart of bulk data delivery operations according to the present invention.

Referring to FIGS. 1 and 2, in accordance with the present invention, there is shown a PMP decoupled connection for reliable data delivery, specifically, bulk data delivery, from an application or a device 11 at source or origin 10 to an application or a device 11 at one or more destinations 12 over a network 14 via site connection manager (SCM) 16 and network connection manager (NCM) 17. The flow of data is from origin to the destinations. The protocol used can be any application level transport protocols such as TCP/IP, UDP/IP etc. In the "decoupled" PMP connection, the origin and destinations connect to the network independent of one another. The application or a device 11 at each site interfaces with the SCM 16 to send or receive data and administer the PMP connections referred in this invention. The SCM 16 interacts with one of the closest NCMs 17 to send or receive data to or from the network and also administers the PMP connections inside the network.

The network 14 can preferably be a data network (e.g. a LAN, a WAN, the Internet), a wireless network (e.g. a cellular data network), some combination of these two types of communication mediums, or some other communication medium, such as for example, a satellite network.

The origin 10 or destinations 12 can preferably be computers such as PCs or workstations, running any one of a variety of operating systems or any device capable of running the SCM 16 and sending or receiving data using protocols (such as TCP/IP, UDP/IP etc.) supported by the SCM 16.

The SCM 16 is software run at each site, i.e. the origin 10 and destination 12. The SCM 16 as will be described in detail below provides APIs to allow applications to create PMP connections, connect to a PMP connection, add new destinations 12 to an existing PMP connection, send or receive data to or from the NCMs 17 on the PMP connections to which it is connected, send or receive data to or from the local application or device 11. The SCM 16 interacts with the NCMs 17 to execute the APIs and perform other administrative operations such as recovery from connection failures. For the further ease of use, facility is provided in the NCMs 17 to maintain connection templates that in turn can be used to create PMP connections.

The NCM 17 is a software or a firmware running on one or more network switches or computer devices connected to network switches. The NCMs 17 implement the PMP connections in the network. The NCMs 17 allow SCMs 16 to connect with them and send commands to create/delete/modify a PMP connection, add destinations to an existing PMP connection, remove destinations from an existing PMP connection and receive status of one or more PMP connections. The NCMs 17 also perform scheduling functions for each PMP connection created in the network. Based on the scheduling constraints, the NCMs 17 initiate a PMP connection with the origin and destination SCMs 16 to send or receive data. If one or more SCMs, 16 are not available, the NCMs 17 repeatedly retry to connect with unavailable SCMs 16 until the scheduling constraints dictate not to try any more. The origin and each destination SCM 16 connect only to one of the several NCMs 17. In general, an SCM 16 will connect to the closest NCM 17 with spare loading capacity. The origin SCM 16 starts sending data to its NCM 17 as soon as the connection has been established. The origin SCM 16 does not wait for the destination SCMs 16 to be connected to the NCMs 17. However, several destination SCMs 16 may already be connected before the origin starts sending the data. The destination SCMs 16 that connect after the origin has started sending data will be referred to as "late". The NCM 17 connected to the origin SCM 16 internally forwards the incoming data to other NCMs 17. Each NCM 17 spools the incoming data and also forwards it to the destination SCMs 16 that connected before the origin started sending the data. For each destination SCM 16 that connected "late", the corresponding NCM 17 sends the data by playing back the spooled data. For each connection to an SCM 16, the corresponding NCM 17 also performs check pointing. In the case failure, the data transmission restarts from the last check pointed state.

In general, data delivery or transmission according to the invention includes decoupled, persistent, reliable, and extendible point-to-multipoint (PMP) connections with per destination scheduling, network spooling and playback, and check-pointing and restart.

Referring back to FIGS. 1 and 2, the first step in using the proposed PMP service is for the application at the origin 10 to create a PMP connection using the API provided by the SCM 16. The SCM 16 at the origin 10 connects to an NCM 17 and sends it the request to create a PMP connection at step 20. The request contains the IP addresses for the origin 10 and possibly for each specified destination 12, application name at the origin 10 and each destination 12, scheduling criterion for each destination 12, parameters related to Time-To-Live, QOS, SLAs etc. At step 21, the NCMs 17 create the requested PMP connection and start its scheduling.

Based on the specified scheduling, at step 22, the NCMs 17 establish TCP/IP connections with the SCMs 16 at the destinations 12. Based on the specified scheduling, at step 23, the NCM 17 also establishes TCP/IP connection with the SCM 16 at the origin 10. At step 24, the NCMs 17 allow TCP/IP connections from any new (not specified at the time of creating the PMP connection) destination SCMs 16. To make use of multicasting, UDP/IP is used. In the case of UDP/IP, there is no notion of a connection. The NCMs 17 and SCMs 16 first create and bind datagram (UDP) sockets. Once, the UDP socket has been created and bound, the NCMs 17 simply start sending the packets to the destination SCMs 16 using the UDP protocol. Since, UDP is not reliable, each NCM 17 waits for an acknowledgements from the corresponding SCMs 16. Packets are retransmitted after a specified time out period.

Once, TCP/IP or UDP/IP sockets have been established between the NCM 17 and the SCM 16 at the origin, the SCM 16 then connects with the application using APIs provided by the SCM 16. At step 25, NCM 17 starts receiving the data from the application 11 via the SCM 16 at the origin 10. Note that the SCM 16 at the origin 10 connects with the NCM 17 at the network 14 and starts sending data without waiting for the destinations 12 to connect to the NCMs 17, thus establishing a decoupled connection. Similarly, as will be discussed below, the destinations can connect to the network and start receiving data any time either during or after the data transmission from the origin to the network. In the decoupled PMP connection, the origin and destinations connect to the network independent of one another. The advantage of decoupled connections is not only the efficiency because the data is sent from the origin to the network only once but also the ease of building applications. Furthermore, the decoupled connections allow the data to be sent at the local line rate rather than being limited by the slowest link amongst all destinations.

The invention is independent of the application or media type. For example, the data can be blocked or streaming and can come from an audio, video, database replication, disk mirroring or any other type of application. In the blocked data, the entire amount of data to be transferred is separated into a plurality of blocks, where each block includes a plurality of packets or frames. The block sizes may be same or variable. The size of the block can either be derived from the largest packet or be selected by a user. The streamed data refers to any data content that can be listened to (audio), viewed (video), or otherwise observed by a user without having to download the data content in its entirety. Streaming content is digitized content that has been compressed or encoded into a format that preferably an origin 10 can break down into packets and then stream across the network 14 to a destination 12.

The data is sent from the application 11 at origin 10 to the network 14 only once via the SCM 16 at the origin 10 and NCM 17 at the network 14. It is then the responsibility of the NCMs 17 at network 14 to deliver the data to the different destinations 12. Data is sent from the origin 10 to network 14 at the speed of the link connecting the origin 10 to the network 14 rather than at the speed of the slowest destination 12. Also at step 25, as the data is received from the origin 10, the receiving NCM 17 forwards the data to other NCMs 17. In other words, the NCMs 17 spool the arriving data. At step 26, the s 17 verify if any existing connections with the SCMs 16 are "late" or "on-time". A connection is "late" if it was established after the origin 10 started sending the data to the network 14; otherwise the connection is "on-time". At step 27, the NCMs 17 forward the incoming data from the origin to SCMs 16 that did not connect "late" i.e. were "on-time". At step 28, for each connection that was "late", the NCM 17 sends the spooled data to the corresponding SCMs 16. At step 29, the NCM 17 checks to see if the origin has transmitted all the data. If "No" then the NCM 17 goes back to step 25 to receive more data. If "Yes" then at step 30 the NCM 17 disconnects from the SCM 16 at the origin 10 and sends the end-of-data signal to other NCMs 17 in the network 14. However, all NCMs 17 continue to accept new connections from destinations until "time to live" parameter associated with the PMP connection has not expired. At step 31, it is check whether "time to live" parameter has expired. If no, then the NCM 17 goes back to step 26 to verify "late" connection. Otherwise, on the expiry of the "time to live" parameter, no new connections from the destinations are accepted and the PMP connection is closed at step 32. The corresponding PMP connection is deleted once all the existing connected destinations have received the data. Also, note that the origin 10 does not wait for the data to be received by the destinations 12, thus establishing a persistent connection. The PMP connection continues to exist in the network until either explicitly requested to be removed or time-to-live parameter associated with it has expired. The persistent PMP connection will allow the destinations to connect to the network and receive data even when the origin has finished sending data and is no longer connected to the network.

Furthermore, new destinations not specified at the time of creating the PMP connection, can be added any time during the existence of the connection to dynamically extend the reach of a PMP connection. Thus this extendable PMP connection adds and connects new destinations 12 as long as the PMP connection exists in the network 14. Also, the data to be delivered from the origin 10 to the destination 12 is reliable. In other words, data transmitted from the origin 10 to the network 14 is delivered from the network 14 to each destination 12 in the same order as it was originally sent by the origin 10.

The data arriving from the origin 10 to the network 14 is forwarded to each destination 12 connected to the network 14. Besides data forwarding, network 14 plays other important roles such as spooling, playback, per destination scheduling, check-pointing and restart, as described in detail below.

Spooling is the capability of the network 14 to store packets containing data sent by the origin 10. All the data transmitted from the origin 10 is stored at step 25 in the network. The packets containing data are stored in the same format and sequence as sent by the origin 10. The data packets spooled in the network 10 generally service "late" connection requests by the destinations 12. A destination 12 is "late" if it was not connected at the time when the origin 10 started sending the packets to the network 14 on the proposed PMP connection. Otherwise, the destination 12 is "on-time". By playback, the network can transmit the spooled data associated with the proposed PMP connection to any destination that connected late.

Additionally, network 14 also sets schedule constraints for the origin 10 and each destination 12. The data will then be received by the network 14 from the origin 10 based on the origin's scheduling constraint. The data will then be delivered by the network 14 to each destination 12 based on its scheduling constraint. The data flowing from each connection, i.e. from origin 10 to network 14 or network 14 to destination 12 is check-pointed by the network 14 at fixed intervals. In the event of a transmission failure, transmission will resume from the last check-pointed state.

Preferably, there are two modes of operations supported at the destinations 12. One is Destination Initiated (Pull) and the other is Network Initiated (Push). In the case of "Destination Initiated", the application at the destination 12 requests using the API provided by its local SCM 16 to connect to a PMP connection. If the requested PMP connection exists in the network 14, i.e. already has been created by the origin 10, then the SCM 16 at the destination site 12 establishes a socket based TCP/IP connection with the network 14 and returns the connection handle to the application. Once the connection with network 14 has been established, the application at the destination 12 can start receiving data if available on the connection otherwise it is blocked waiting for the data to arrive.

In the case of "network initiated", at the time of creating a PMP connection and based on the specified scheduling, the network 14 tries to establish a connection with each destination 12 not already connected. To do this, the appropriate NCM 17 requests the SCM 16 at each destination 12 not already connected to invoke the appropriate application and establish the connection. The application invoked is the one specified by the administrator of the origin 10 at the time of creating the connection in the network. Once the connection with network has been established, the application at the destination 12 can start receiving data if available on the connection otherwise it is blocked waiting for the data to arrive.

While the invention has been described in relation to the preferred embodiments with several examples, it will be understood by those skilled in the art that various changes may be made without deviating from the spirit and scope of the invention as defined in the appended claims.

What is claimed is:

1. A method for guaranteed delivery of data from an origin to multiple destinations, the method comprising:

receiving the data from said origin to a network only once at a speed of link connecting said origin to said network, without waiting for said destinations to be connected to said network, wherein the data is sent by said origin in a specific format and sequence;

delivering the data from said network to one or more said destinations at a speed of link connecting said destination to said network, thereby creating a point-to-multipoint connection between said network and said destinations, wherein the data is delivered to said destinations in said specific format and sequence;

receiving a request from a disconnected destination of said destinations to connect to said network and to receive the data in said specific format and sequence sent by said origin, wherein a part of the data has already been sent from said origin to said network;

connecting to said requesting destination through said network upon said request on an existing said point-to-multipoint connection; and delivering to said requesting destination said part of the data in said specific format and sequence sent by said origin.

2. The method of claim 1 further comprising:

storing the data in said network in said specific format and sequence sent by said origin.

3. The method of claim 1, wherein all of the data has already been sent from said origin to said network and said origin is disconnected from said network and said delivery step delivers to said requesting destination said all of the data in said specific format and sequence sent by said origin, wherein said requesting destination remains connected to said network and receives the data even after said origin is disconnected from said network.

4. The method of claim 1, further comprising:

initiating a request from said network to one of said destinations not connected to said network to establish a connection for said point-to-multipoint connections; and delivering the data to one of said destinations based on specified scheduling constraints, wherein one of said destinations is available and reachable.

5. The method of claim 1, further comprising:

adding new destinations to be connected to said network, wherein said new destinations are not specified during the creation of said point-to-multipoint connection.

6. The method of claim 1, further comprising:

check pointing of data at fixed intervals during transmission of the data from said origin to said network and during transmission of the data from said network to said destinations.

7. The method of claim 6, wherein upon transmission failure, the data resumes transmission from the interval where said failure occurred.

8. The method of claim 1, further comprising sending a positive acknowledgement from said network to said origin upon receipt of all the data from said origin.

9. The method of claim 7, further comprising disconnecting said origin from said network upon the receipt of all the data from said origin.

10. The method of claim 1, wherein one of said destinations is connected to said network during transmission of the data from said origin to said network.

11. The method of claim 1, wherein one of said destinations is connected to said network after the transmission of all the data from said origin to said network.

12. A data transmission system, comprising:

a site connection manager located at an origin and also at each of a plurality of destinations for interacting between said origin and a network and between said destinations and said network;

an at least one first network connection manager located at said network configured to create a point-to-multipoint connection from said origin to said destinations, wherein the data is received from said origin to said network only once at a speed of link connecting said origin to said network without waiting for said destinations to be connected to said network; and a checking point of data provided to check the data at fixed intervals during transmission of the data from said origin to said network and during transmission of the data from said network to said destinations.

* * * * *